United States Patent Office 3,611,809
Patented Oct. 12, 1971

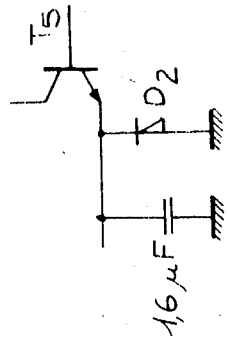
Fig.6
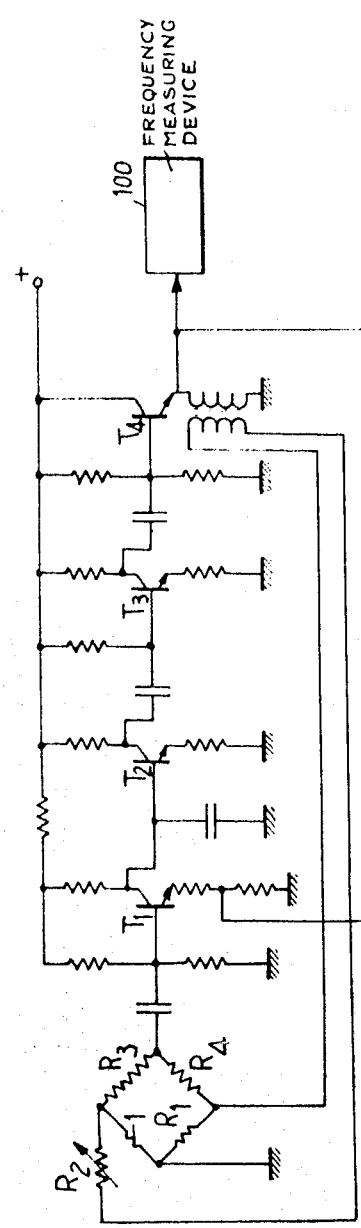
Fig.5
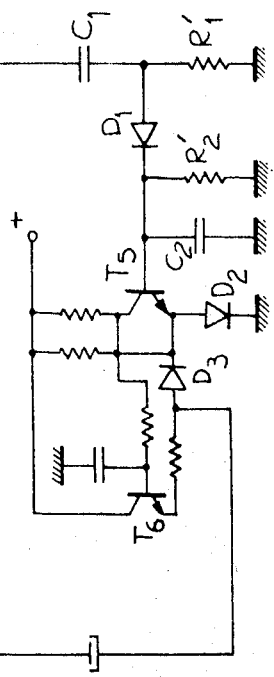

3,611,809
VIBRATING STRING GRAVIMETERS
Michel Cantat and Raymond Mathey, Paris, France, assignors to CSF-Compagnie Generale de Telegraphie Sans Fil, Paris, France
Filed July 2, 1968, Ser. No. 741,967
Claims priority, application France, July 6, 1967, 113,417
Int. Cl. G01v 7/04
U.S. Cl. 73—382                                    3 Claims

ABSTRACT OF THE DISCLOSURE

A vibrating string gravimeter comprising, inside a housing, a mass suspended on a vibrating string, which is attached to the housing and vibrates in the field of a permanent magnet. At least two elastic parallel diaphragms attach the mass to the housing. The mass and the housing have plane and polished horizontal surfaces facing each other and at a distance from each other adjusted for damping the displacements of the mass by lamination of air between these surfaces.

---

The present invention relates to gravimeters comprising an inert mass suspended on a vibrating string.

It is an object of the invention to provide a gravimeter more particularly adapted for measuring the acceleration of gravity on board of vehicles with an accuracy better than a milligal over a range of several hundreds of thousands of milligals around a mean value of about $10^6$ milligals, while withstanding transverse accelerations (perpendicular to the gravitational acceleration) higher than at least three times the gravitational acceleration. It is another object of the invention to provide a miniaturized gravimeter which may be readily included easily into an inertia guidance system.

These requirements have been very difficult to meet and present day gravimeters are generally unable to preserve a sufficient precision.

According to the invention there is provided a vibrating string gravimeter comprising: a housing; within said housing a vibrating string attached thereto and an inert mass suspended on said string; means for providing a magnetic field about said string; means for causing said string to vibrate transversely at its resonance frequency; means for measuring said frequency; at least two elastic parallel diaphragms attaching said mass to said housing, said diaphragms being apertured and arranged for presenting a minimum stiffness for vertical displacement of said mass and a maximum stiffness for any other displacement thereof; said mass having at least one plane and polished horizontal face and said housing having a corresponding plane and polished face arranged in front of and parallel to said horizontal face at a distance from said horizontal face, for the damping of the displacements of said mass by lamination of air enclosed between said faces.

For a better understanding of the invention and to show how the same may be carried into effect reference will be made to the drawings accompanying the following description and in which:

FIG. 5 is an electric circuit for the vibration of the vibrating string; and

FIG. 6 is a variation of detail in FIG. 5.

Figure 1:
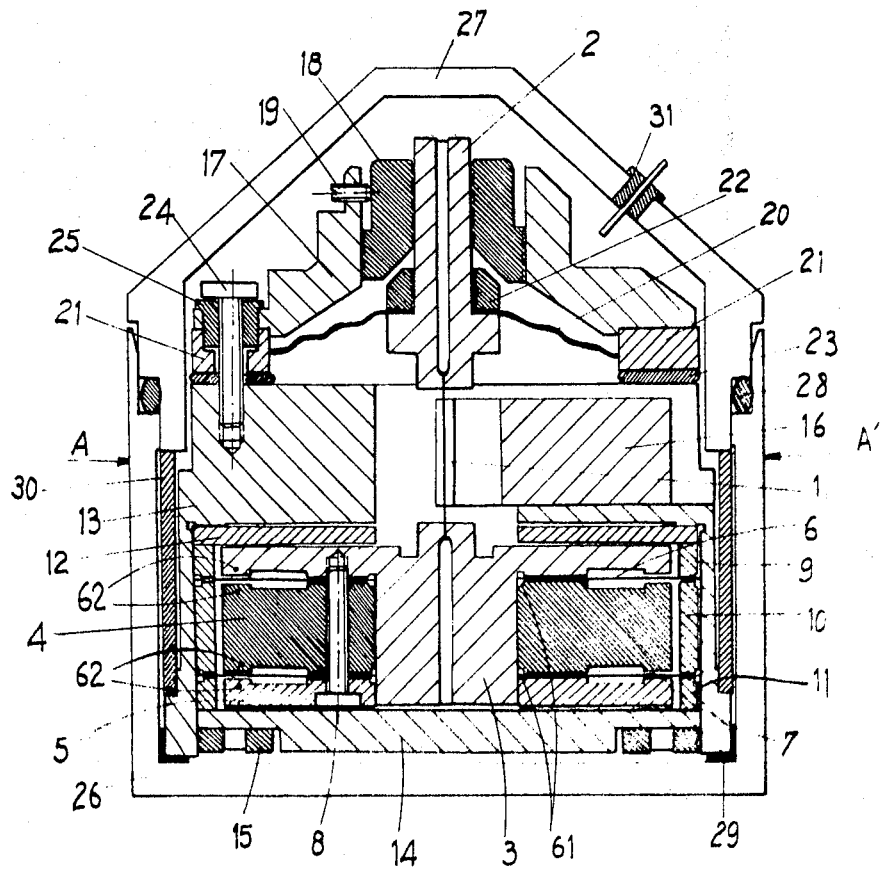
FIG. 1 is a section of the gravimeter according to the invention along a vertical plane.

In FIG. 1, a vibrating string 1, which may be a thread or a strip of electrically conducting or metallized material, is fixed to two fixing members 2 and 3. String 1 is embedded into these members to a depth of some tenths of a millimeter and is connected thereto, for example, by brazing or welding. The end portions of members 2 and 3 extend to a certain distance from the bodies of these members and are separated therefrom by a slot in the case of the member 3 and by a shoulder in the case of the member 2. This prevents mechanical stresses which arise from the parts assembled on the members 2 and 3 from being transmitted to the attachment zone where the string ends are attached, which might affect the stability of the measurement. These end portions terminate in a large plane surface assuring a break in the acoustic impedance between the string 1 and the bodies of the members 2 and 3 so as to prevent the dissipation therein of a substantial part of the vibration energy of the string 1.

The member 3 forms a part of an inert assembly suspended on the string 1. This assembly also comprises parts 4 and 5, held by screws 8 and between which and the body 3 are clamped two elastic perforated diaphrams 6 and 7. The parts 3, 4 and 5 are made of non-magnetic materials, so as to protect the mass from the effects of the ambient magnetic field, and have preferably a high density in order to reduce the dimensions of the assembly, so as to reduce the effects of Archimedean thrust and to reduce, for a given value of the mass, the values of the moments of inertia affecting the assembly during parasitic movements. The parts 3, 4 and 5 have grooves 61 for clamping the diaphragms at a certain distance from the edge of the cut-out portions thereof, which avoids inaccuracies in the positioning due to the possible presence of rough edges of the diaphragms. The parts 3, 4 and 5 have also projections 62, located opposite the solid portions of the diaphragms 6 and 7, the purpose of which will be explained further below. The upper surfaces and the lower surfaces of the assembly 3-4-5 are plane and polished.

The assembly formed by the member 2, the string 1, the member 3 and the parts assembled therewith, is placed inside a housing 13 associated with an upper part 17 and a base 14. The member 2 is fixed in the upper part 17 by means of a differential nut 18 for regulating the position of the inert mass in the housing.

Once, the position of this nut has been adjusted, the nut is blocked by means of screws 19. The member 2 is also fixed by means of a nut 22 within the hole formed in the centre of an undulated diaphragm 20 with reinforced outer edge 21. The upper part 17 of the housing rests on the edge 21 of the diaphragm 20 and the latter rests on the body of the housing 13 by means of an insulator 23, made of a material with good thermal and mechanical stability, for example, steatite, and the whole is held together by screws 24 insulated by sleeves 25.

The diaphragm 20 is aimed at centering with accuracy the member 2, to prevent it from rotating when the differential nut 18 is being adjusted, while permitting the vertical movement of the member 2 during this adjustment, and at applying to the assembly comprising the member 2, the nut 18 and the housing upper part 17 an axial load (e.g., of the order of 10 kg.), eliminating play and ensuring stability, while closing the chamber containing the string and the mass suspended on the latter by a continuous wall, protecting it against accidental entry of dust, even of microscopic dimensions.

Figure 2:
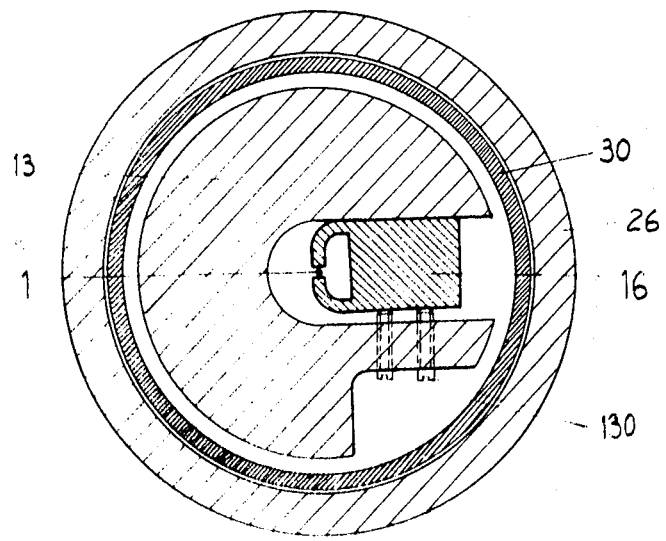
FIG. 2 is a section along A-A' of the gravimeter of FIG. 1.

The string 1 is mounted in the field of a permanent magnet 16 located in a recess formed in the body of the housing 13 and fixed thereto by screws 130, as shown in section in FIG. 2.

The base 14 of the housing is assembled to the body 13 by a flat nut 15. It applies a part 12 against the housing 13 through spacers 9, 10 and 11 which clamp between them the outer portion of the diaphragms 6 and 7. At least the spacer 10 is made of a material having the same coefficient of thermal expansion as the part 4 of the mass so as to reduce the thermal drift of the apparatus. These spacers have, as the parts 3, 4 and 5, grooves for preventing the edges of the diaphragms from being pinched. The part 12 has a plane and polished lower surface parallel to the upper surface of the part 3. Similarly, the upper surface of the base 14 is plane and polished.

The assembly just described is placed in a tight box, comprising a cup-shaped body 26 and a cover 27, between which a sealing joint 28 is interposed. These elements are of soft, highly permeable ferromagnetic material, for example, of mumetal, in order to protect the apparatus against the effects of ambient magnetic fields. A partial vacuum (e.g., of the order of 1 mm. Hg) is produced inside the box. The housing 13 makes contact with the box only by means of a joint 29 and a spacer 30. This makes it possible to protect the apparatus against mechanical stresses applied to the box, especially those caused by changes in the atmospheric pressure, and to ensure a good thermal insulation between the box and the apparatus itself so as to minimize the effects of thermal drifts. Tight electrical connections 31 make it possible to form the necessary connections.

The operation of the gravimeter is as follows:

The string 1 is maintained in the vertical position, for example, by placing the apparatus on a stabilized platform, not shown. The inert mass formed by the elements 3, 4 and 5, suspended on the string 1 is subjected to the gravitational acceleration $g$. The string 1 is transversely vibrated at its fundamental frequency by means of a self-oscillating circuit, described further below and connected between the two ends of the string 1 by means of the member 2 on one hand and the diaphragms 6 and 7 and the suspended mass on the other. These elements must therefore be of electrically conducting material.

Taking into account the stiffness inherent to the string 1, this frequency is given by a relation of the form:

$$f = A\sqrt{g} + B + \frac{C}{\sqrt{g}}$$

The coefficients A, B and C may be determined by calculation or by calibrating at at least three different points, where $g$ is known accurately. It is then sufficient to measure the frequency $f$ for knowing the gravitational acceleration at any desired point.

For the gravimeter to be used on any moving body or vehicle, it is necessary that it should not respond to non-vertical accelerations.

Figure 3:
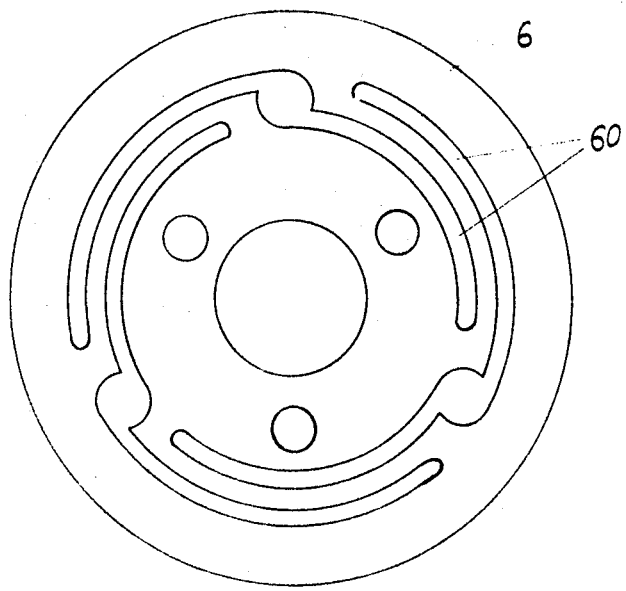
FIG. 3 shows in plane view one of the diaphragms used in the gravimeter according to the invention.

This is achieved by means of parallel perforated elastic diaphragms 6 and 7, as embodiment of which is shown in FIG. 3. These diaphragms are made from materials used for making spring of the highest possible molecular stability, for example, of the material known as "Elinvar."

The configuration of the apertures (60 in the diaphragm 6) and the relative arrangement of the diaphragms are such that the diaphragms ensure maximum mobility of the mass suspended on the string 1 in a predetermined vertical direction, aligned here with the axis of the string 1 (but which could be otherwise if a non-vertical string were used), and counteract with maximum stiffness both transverse movements of the mass and rotational movements about any axis. With the construction shown in FIG. 3 (although this is not limitative) it is possible to achieve a stiffness 400 times greater in the horizontal plane than along the axis along which the movement takes place.

Moreover, in any vehicle, the gravimeter according to the invention is subject to vibrations. It may happen that, owing to resonance phenomena, the amplitude of these vibrations is amplified; in order to avoid this, the oscillator formed by the string 1 (playing the role of a spring) and the mass suspended on it is suitably damped by using the residual gases between the plane and polished surfaces of the suspended mass and the part 12 and base 14, this gas being "laminated" during the vibration.

For achieving the double effect damping, the spacers 9 and 11 are so dimensioned that the facing surfaces are at a very small distance from each other (for example of the order of five hundredths of a millimetre) and the pressure inside the gravimeter is not reduced beyond the value at which the viscosity coefficient of the residual gases can no longer be regarded as constant. If $v$ is the relative velocity of the displacement of the surfaces considered relative to each other, the force F due to the "lamination" of the residual gases and opposing this movement can be written:

$$\vec{F} = -k\vec{v}, \text{ with } k = A \cdot \eta \cdot \frac{R^4}{d^3}$$

where A is a constant, $\eta$ is the coefficient of viscosity of the residual gases, R is the radius of one facing surface, and $d$ is the spacing between the surfaces.

This damping effect is reinforced by a similar effect occurring between the projections 62 and the non-apertured outer part of the diaphragms 6 and 7.

Actually, the projections 62 are positioned at a very small distance from the corresponding diaphragms, so as to participate in the damping and in limiting the possible amplitude of the vertical movements of the suspended mass so as to prevent the elastic limits of the string from being exceeded, which enables the characteristics of the apparatus to be maintained and the risk of fracture of the spring in the case of shocks or jerks to be eliminated.

In order to improve further the performance of the gravimeter, the housing 13 may be constructed of a material having a higher thermal expansion coefficient than that of the string, this coefficient being chosen as a function of the stiffness of the diaphragms 6 and 7 so that a rise in the temperature causes a flexion of the diaphragms resulting in an increase in the tensioning of the string, entirely or partly compensating the lowering in the frequency caused by the thermal extension of the string.

Such a gravimeter is therefore a very robust, highly stable and miniaturized apparatus. In one such embodiment, an apparatus has been made with a 40 mm. outer diameter and 40 mm. height. The string 1 had a length of 7.5 mm. and a 0.05 mm. diameter, with fundamental resonance frequency with the suspended mass used was of the order of 10 kc./s. The sensitivity was of the order of $5.10^{-3}$ Hz./mgal. The movements of the mass were limited to $\pm 0.02$ to 0.03 mm.

Figure 4:
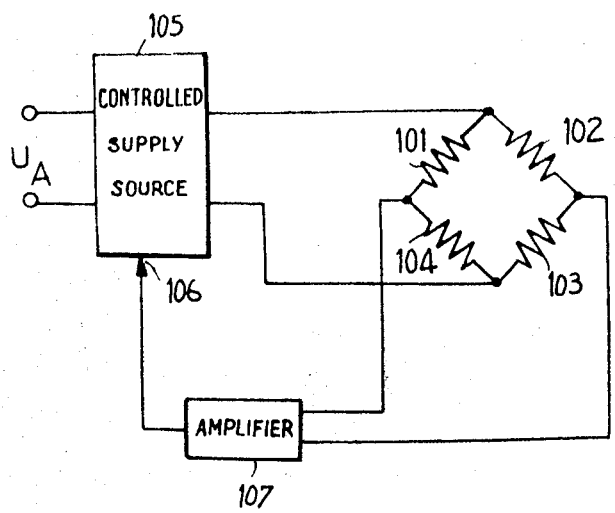
FIG. 4 is an electric circuit for the temperature control used in the gravimeter according to the invention.

It is also preferable to protect the gravimeter as far as possible against variation of the temperature. To this end, it may be mounted in a thermostatically controlled chamber, comprising, for example, a double wall with heating resistances. Metal partitions, whose good conductance ensures the uniform temperature distribution may be advantageously inserted between the two walls. The space between the walls and partitions is filled with a porous material which is a poor heat conductor, such as rubber foam or polymethane foam and the whole is encased in a thermally badly conducting envelope. The temperature control may be effected advantageously as shown in FIG. 4 by placing the resistances 101, 102, 103 and 104 into a bridge supplied by a controlled supply 105 receiving a feed voltage $U_A$ and having a control input 106.

The heating resistances 101 and 103 on the one hand, and 102 and 104 on the other are made of a material having a different temperature coefficient and are so dimensioned that the bridge is in equilibrium only for the desired temperature. The unbalance voltage of the bridge, when the temperature deviates from the desired temperature is amplified in an amplifier 107 and applied to the control input 106. Preferably, for the equilibrium temperature a sufficiently high value will be chosen, for example, 50 or 60° C.

The voltage $U_A$ is a D.C. voltage or an A.C. voltage with low frequency (at the most a few hundred c./s.) to avoid interference with the measurements, and the fundamental vibration frequency of the string is clearly higher.

The self-oscillating circuit for maintaining the vibration of the string 1 is shown in FIG. 5. The string 1 is mounted, as known, in a Wheatstone bridge, mounted in turn in the feedback loop of an amplifier. The vibration of the string (Kennelly actional impedance circle) causes the unbalance of the bridge at the resonance frequency of the string.

An amplitude control device prevents the impression on the string 1 of vibrations with an excessively high amplitude which would modify somewhat the resonance frequency. In FIG. 5, the Wheatstone bridge comprises the string 1 and the resistances $R_1$, $R_3$ and $R_4$. The resistance $R_1$ is formed preferably by a string similar to the string 1 but not tensioned and not vibrating. The string 1 moves in the field of the magnet 16 and an electromotive force appears at its ends.

An A.C. voltage of the same frequency as the vibration frequency of the string appears therefore between the two opposite apices of the bridge.

This voltage is amplified in an amplifier comprising the transistors $T_1$, $T_2$, $T_3$ and $T_4$ and is applied to a device 100 for measuring the frequency and if need be for recording it. A part of the output voltage is taken from a transformer mounted in the circuit of the emitter of the transistor $T_4$ and is conducted to the two other corners of the bridge via a regulating resistor $R_2$ with suitable phase for maintaining the vibrations of the string.

Of course, it is also possible to utiltize as transistor $T_4$ a p-n-p transistor charged by resistors which will produce a better stability of the phase of the reaction voltage.

The amplitude control device comprising the transistors $T_5$ and $T_6$ is connected between the output of the transistor $T_4$ and the emitter circuit of the transistor $T_1$, controlling its polarity as a function of the amplitude of the output signal.

The output signal taken through the circuit $C_1,R'_1$, and rectified by a diode $D_1$, is integrated by the circuit $C_2,R'_2$, then applied to the base of the transistor $T_5$. The transistors $T_5$ and $T_6$, charged by the variable resistances of the diodes $D_2$ and $D_3$ permit then that a control voltage may be applied to the transistor $T_1$.

FIG. 6 shows a variation of the embodiment in which the diode $D_2$ is replaced by a Zener diode $D'_2$ (in parallel with a capacitor), supplying a reference voltage. It is also possible to compare the output voltage of the circuit $C_2,R'_2$ with the voltage of a standard pile.

Of course the invention is not limited to the embodiments described and shown which were given solely by way of example.

What is claimed is:
1. A vibrating string gravimeter comprising:
a housing;
within said housing a vibrating string attached thereto and an inert mass suspended on said string;
means for providing a magnetic field about said string;
means for causing said string to vibrate transversely at its resonance frequency;
means for measuring said frequency;
and at least two elastic parallel diaphragms attaching said mass to said housing,
said diaphragms being apertured and arranged for presenting a minimum stiffness for vertical displacement of said mass and a maximum stiffness for any other displacement thereof,
said mass bearing horizontal flat parts,
and said housing bearing corresponding flat and polished parts arranged in front of and parallel to said horizontal parts,
said corresponding flat parts being at least the non-apertured outer part of said elastic parallel diaphragms, at a distance from said horizontal parts, for the damping of the displacement of said mass by lamination of air enclosed between said parts.

2. A gravimeter as in claim 1, wherein said housing comprises a vacuum-tight portion for an adjustment of said damping by adjustment of its internal pressure.

3. A gravimeter as in claim 2, wherein said vacuum-tight portion is closed, at the string extremity fixed to said housing, by an undulated diaphragm-shaped wall, centrally supported by the string fixing member to the housing, and peripherally supported by said housing, for externally adjusting the mechanical string tension.

References Cited

UNITED STATES PATENTS

| | | | |
|---|---|---|---|
| 2,767,973 | 10/1956 | Ter Veen et al. | 73—517 |
| 3,019,641 | 2/1962 | Shapiro | 73—517 AV |
| 3,122,024 | 2/1964 | Trachtenberg | 73—517 AV |
| 3,417,626 | 12/1968 | Riordan | 73—516 |
| 2,265,011 | 12/1941 | Siegel | 73—382 |
| 2,542,018 | 2/1951 | Ferrill, Jr. | 73—505 UX |
| 2,715,680 | 8/1955 | Tatel et al. | 73—516 X |
| 3,089,343 | 5/1963 | Rule | 74—516 |
| 3,224,245 | 12/1965 | Alibrandi et al. | 73—517 X |
| 3,240,073 | 3/1966 | Pitzer | 73—517 |

FOREIGN PATENTS

| | | | |
|---|---|---|---|
| 861,325 | 2/1961 | Great Britain | 73—517 AV |

JAMES J. GILL, Primary Examiner

U.S. Cl. X.R.

73—517 AV